United States Patent
Ohashi et al.

(10) Patent No.: US 12,535,548 B2
(45) Date of Patent: Jan. 27, 2026

(54) COMMUNICATION DEVICE AND POSITION ESTIMATION METHOD

(71) Applicant: KABUSHIKI KAISHA TOKAI RIKA DENKI SEISAKUSHO, Aichi (JP)

(72) Inventors: Yosuke Ohashi, Aichi (JP); Masateru Furuta, Aichi (JP); Yuki Kono, Aichi (JP); Shigenori Nitta, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 393 days.

(21) Appl. No.: 17/791,360

(22) PCT Filed: Dec. 3, 2020

(86) PCT No.: PCT/JP2020/044975
§ 371 (c)(1),
(2) Date: Jul. 7, 2022

(87) PCT Pub. No.: WO2021/192426
PCT Pub. Date: Sep. 30, 2021

(65) Prior Publication Data
US 2023/0138363 A1    May 4, 2023

(30) Foreign Application Priority Data
Mar. 23, 2020   (JP) .................................. 2020-051716

(51) Int. Cl.
*G01S 5/00* (2006.01)
*G01S 5/02* (2010.01)

(52) U.S. Cl.
CPC .......... *G01S 5/0036* (2013.01); *G01S 5/0258* (2020.05)

(58) Field of Classification Search
CPC .... G01S 5/0036; G01S 5/0258; G01S 13/765; G01S 13/878; B60R 25/245
See application file for complete search history.

(56) References Cited

U.S. PATENT DOCUMENTS 9,566,945 B2   2/2017   Ghabra et al.
2011/0309922 A1* 12/2011  Ghabra .................. B60R 25/24
                                                340/426.36

(Continued)

FOREIGN PATENT DOCUMENTS

JP    2014-84595 A    5/2014
WO   2018/148687 A1   8/2018

OTHER PUBLICATIONS

International Search Report issued in International Bureau of WIPO Patent Application No. PCT/JP2020/044975, dated Feb. 22, 2021, along with an English translation thereof.

*Primary Examiner* — Aniss Chad
*Assistant Examiner* — Chase L Cooley
(74) *Attorney, Agent, or Firm* — GREENBLUM & BERNSTEIN, P.L.C.

(57) ABSTRACT

A communication device including: a plurality of wireless communicators configured to perform wireless communication with another communication device; and a controller configured to estimate a position at which the other communication device is located on the basis of a plurality of measured distance values which indicate distances between the plurality of wireless communicators and the other communication device and which are acquired through wireless communication performed by the plurality of wireless communicators.

10 Claims, 6 Drawing Sheets

(56) References Cited

U.S. PATENT DOCUMENTS

2014/0330449 A1   11/2014  Oman et al.
2017/0190318 A1*  7/2017  Imamura ............... H04W 76/11
2018/0007507 A1    1/2018  Ghabra et al.
2018/0234797 A1    8/2018  Ledvina et al.
2019/0304226 A1* 10/2019  Golsch ................. G01S 5/0273

* cited by examiner

COMMUNICATION DEVICE AND POSITION ESTIMATION METHOD

TECHNICAL FIELD

The present invention relates to a communication device and a position estimation method.

BACKGROUND ART

Recently, various techniques for measuring a distance between devices (hereinafter also referred to as distance measuring) have been developed. For example, Patent Literature 1 discloses a technique of measuring a distance between devices on the basis of a time required for a signal to be received after the signal has been transmitted (hereinafter also referred to as a propagation time).

CITATION LIST

Patent Literature

Patent Literature 1: U.S. Pat. No. 9,566,945

SUMMARY OF INVENTION

Technical Problem

Measuring a distance between devices can be understood as estimating a position of one device relative to the other device. However, it is preferable to estimate a position of a device in more detail.

Therefore, the present invention was made in consideration of the aforementioned circumstances and an objective of the present invention is to provide a structure that enables a position of a device to be estimated in more detail.

Solution to Problem

To solve the above described problem, according to an aspect of the present invention, there is provided a communication device comprising: a plurality of wireless communicators configured to perform wireless communication with another communication device; and a controller configured to estimate a position at which the other communication device is located on the basis of a plurality of measured distance values which indicate distances between the plurality of wireless communicators and the other communication device and which are acquired through wireless communication performed by the plurality of wireless communicators.

To solve the above described problem, according to another aspect of the present invention, there is provided a position estimation method comprising: estimating a position at which another communication device is located on the basis of a plurality of measured distance values which indicate distances between a plurality of wireless communicators configured to perform wireless communication with the other communication device and the other communication device and which are acquired through wireless communication performed by the plurality of wireless communicators.

Advantageous Effects of Invention

According to the present invention, it is possible to provide a structure that enables a position of a device to be estimated in more detail as described above.

DESCRIPTION OF EMBODIMENTS

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

Further, in the present specification and the drawings, different alphabets are suffixed to a same reference numeral to distinguish elements which have substantially the same functional configuration. For example, a plurality of elements which have substantially the same functional configuration are distinguished such as first wireless communicators 210A and 210B, as necessary. However, when there is no need in particular to distinguish elements that have substantially the same functional configuration, the same reference numeral alone is attached. For example, in the case where it is not necessary to particularly distinguish the first wireless communicators 210A and 210B, the first wireless communicators 210A and 210B are simply referred to as the first wireless communicators 210.

1. Example of Configuration

Figure 1:
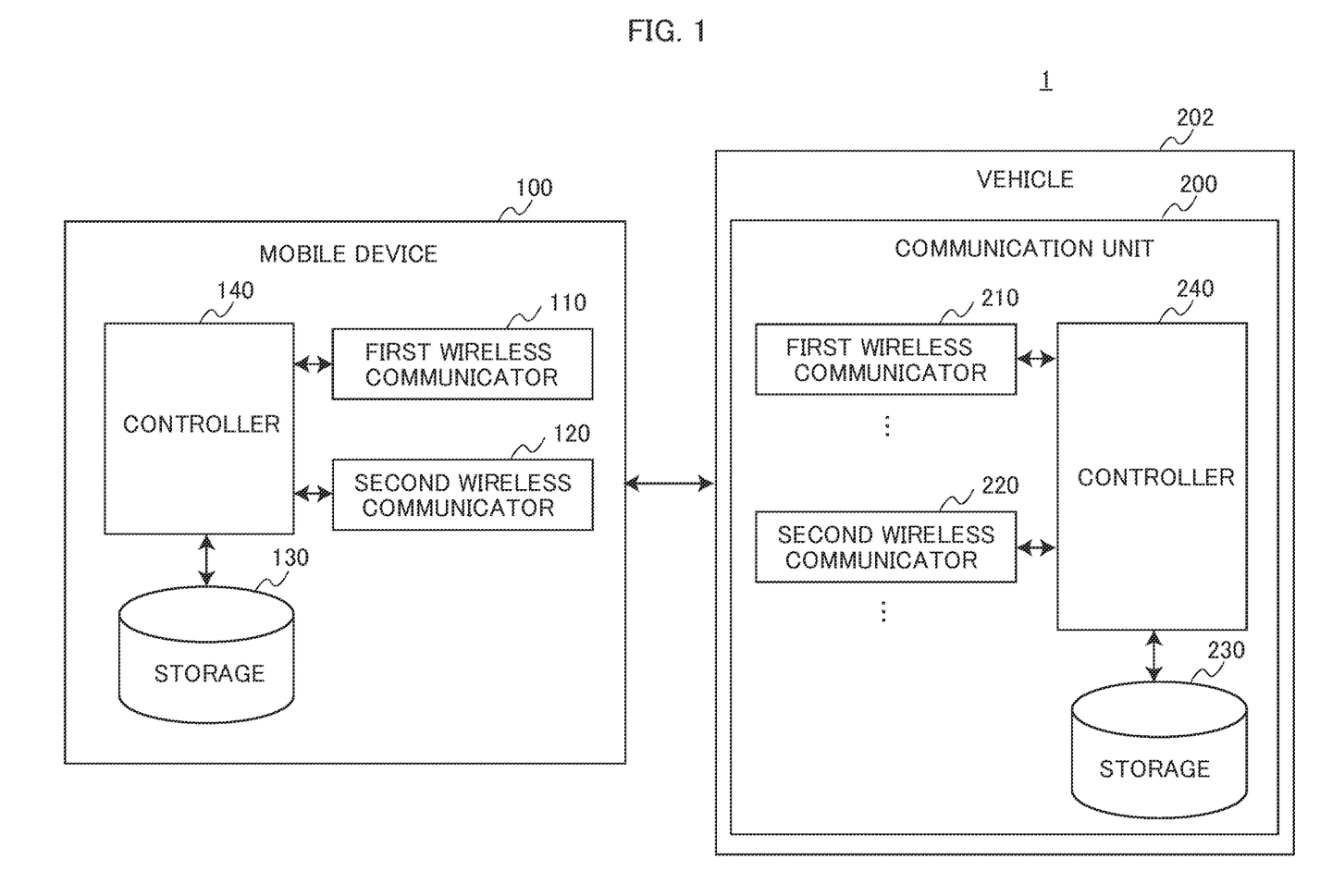
FIG. 1 is a diagram illustrating an example of a configuration of a system according to an embodiment of the present invention.

FIG. 1 is a diagram illustrating an example of a configuration of a system 1 according to an embodiment of the present invention. As illustrated in FIG. 1, the system 1 according to this embodiment includes a mobile device 100 and a communication unit 200. The communication unit 200 according to the embodiment is mounted in a vehicle 202. The vehicle 202 is an example of an object that is used by a user.

A communication device of an authentication requesting party (also referred to as a first communication device) and a communication device of an authenticator party (also referred to as a second communication device) participate in the present invention. The mobile device 100 is an example of a first communication device. The communication unit 200 is an example of the second communication device.

In the system 1, when a user (for example, a driver of the vehicle 202) with the mobile device 100 approaches the vehicle 202, wireless communication for authentication is performed between the mobile device 100 and the communication unit 200. When the authentication succeeds, a door of the vehicle 202 is unlocked or an engine is started such that the vehicle 202 enters a state in which it can be used by the user. The system 1 is also referred to as a smart entry system. The constituents will be sequentially described below.

(1) Mobile Device 100

The mobile device 100 is a communication device that performs wireless communication with the communication unit 200. The mobile device 100 is configured as an arbitrary device which is carried for use by a user. Examples of the arbitrary device include an electronic key, a smartphone, and a wearable terminal. As illustrated in FIG. 1, the mobile device 100 includes a first wireless communicator 110, a second wireless communicator 120, a storage 130, and a controller 140.

The first wireless communicator 110 has a function of performing communication based on a first wireless communication standard. For example, the first wireless communicator 110 performs wireless communication with the communication unit 200. The second wireless communicator 120 has a function of performing communication based on a second wireless communication standard. For example, the second wireless communicator 120 performs wireless communication with the communication unit 200.

An example of the first wireless communication standard is Bluetooth Low Energy (BLE: registered trademark). BLE is known as a wireless communication standard with low power consumption. In BLE, signals in a 2.4 GHz band are transmitted and received.

As an example of the second wireless communication standard, signals are transmitted and received using an ultra-wide band (UWB). In wireless communication of signals using UWB, when an impulse system is used, it is possible to measure a propagation time of radio waves with high accuracy using radio waves with a very short pulse width equal to or less than nano seconds and to measure a distance based on the propagation time with high accuracy. UWB often indicates a frequency band of about 3 GHz to about 10 GHz.

In wireless communication, it is known that power consumption of a receiving side becomes higher as a frequency of carrier waves becomes higher. This is because a sampling frequency of the receiving side becomes higher as the frequency of carrier waves becomes higher. Accordingly, the power consumption of the receiving side in BLE is lower than that in the wireless communication standard using UWB.

In the following description, it is assumed that the first wireless communication standard is BLE. That is, the first wireless communicator 110 is configured as a communication interface that can perform communication in BLE. It is also assumed that the second wireless communication standard is a wireless communication standard using UWB. That is, the second wireless communicator 120 is configured as a communication interface that can perform communication using UWB.

The storage 130 has a function of storing various types of information for operation of the mobile device 100. For example, the storage 130 stores programs for operation of the mobile device 100 and an identifier (ID), a password, an authentication algorithm, and the like for authentication. The storage 130 is constituted, for example, by a storage medium such as a flash memory and a processing device that performs recording and reproduction of data in the storage medium.

The controller 140 has a function of performing processes in the mobile device 100. For example, the controller 140 controls the first wireless communicator 110 and the second wireless communicator 120 such that communication with the communication unit 200 is performed. The controller 140 performs reading of information from the storage 130 and writing of information to the storage 130. The controller 140 controls an authentication process which is performed in cooperation with the communication unit 200. The controller 140 is constituted, for example, by an electronic circuit such as a central processing unit (CPU) and a microprocessor.

(2) Communication Unit 200

The communication unit 200 is a communication device that performs wireless communication with the mobile device 100. The communication unit 200 is installed in correlation with the vehicle 202. Here, it is assumed that the communication unit 200 is mounted in the vehicle 202 by installing the communication unit 200 in the cabin of the vehicle 202, incorporating the communication unit 200 as a communication module into the vehicle 202, or the like.

As illustrated in FIG. 1, the communication unit 200 includes a plurality of first wireless communicators 210, a plurality of second wireless communicators 220, a storage 230, and a controller 240.

Each first wireless communicator 210 has a function of performing communication based on the first wireless communication standard. For example, the first wireless communicator 210 performs wireless communication with the mobile device 100. In the following description, it is assumed that each first wireless communicator 210 is configured as a communication interface that can perform communication using BLE.

Each second wireless communicator 220 has a function of performing communication based on the second wireless communication standard. For example, the second wireless communicator 220 performs wireless communication with the mobile device 100. In the following description, it is assumed that the second wireless communicator 220 is configured as a communication interface that can perform communication using UWB.

The storage 230 has a function of storing various types of information for operation of the communication unit 200. For example, the storage 230 stores programs for operation of the communication unit 200 and an authentication algorithm. The storage 230 is constituted, for example, by a storage medium such as a flash memory and a processing device that performs recording and reproduction of data in the storage medium.

The controller 240 has a function of controlling all operations of the communication unit 200 and onboard devices mounted in the vehicle 202. For example, the controller 240 controls the first wireless communicators 210 and the second wireless communicators 220 such that communication with the mobile device 100 is performed. The controller 240 performs reading of information from the storage 230 and writing of information to the storage 230. The controller 240 also serves as an authentication controller that controls an authentication process performed in cooperation with the mobile device 100. The controller 240 also serves as a door lock controller that controls a door lock of the vehicle 202 and performs locking and unlocking of the door lock. The controller 240 also serves as an engine controller that controls an engine of the vehicle 202 and performs starting/stopping of the engine. A power source provided in the vehicle 202 may be a motor or the like in addition to the engine. The controller 240 is configured as, for example, an electronic control unit (ECU).

2. Technical Features

(1) Distance Measuring Process

The mobile device 100 and the communication unit 200 perform a distance measuring process. The distance measuring process is a process of measuring a distance between the mobile device 100 and the communication unit 200. The distance measured through the distance measuring process is also referred to as a measured distance value in the following description.

In the distance measuring process, signals can be transmitted and received in a wireless manner.

An example of the signals transmitted and received in the distance measuring process is a distance-measuring signal. The distance-measuring signal is a signal that is transmitted and received to measure an inter-device distance. The distance-measuring signal is also a signal that is to be measured. For example, a time required for transmission and reception of the distance-measuring signal is measured. Typically, the distance-measuring signal is formed in a frame format not including a payload part in which data is stored. The distance-measuring signal may be formed in a frame format including a payload part in which data is stored.

In the distance measuring process, a plurality of distance-measuring signals can be transmitted and received between devices. A distance-measuring signal transmitted from one device to the other device out of the plurality of distance-measuring signals is also referred to as a first distance-measuring signal. A distance-measuring signal transmitted from the device having received the first distance-measuring signal to the device having transmitted the first distance-measuring signal is also referred to as a second distance-measuring signal.

Another example of the signals transmitted and received in the distance measuring process is a data signal. The data signal is a signal for storing and carrying data. The data signal is formed in a frame format including a payload part in which data is stored.

Transmitting and receiving of signals in the distance measuring process is also referred to as distance-measuring communication in the following description. In this embodiment, it is assumed that the second wireless communicator 120 and the second wireless communicator 220 perform distance-measuring communication. In the distance measuring process, a distance between the second wireless communicator 120 and the second wireless communicator 220 having performed distance-measuring communication is measured as the distance between the mobile device 100 and the communication unit 200.

An example of the distance measuring process will be described with reference to FIG. 2.

Figure 2:
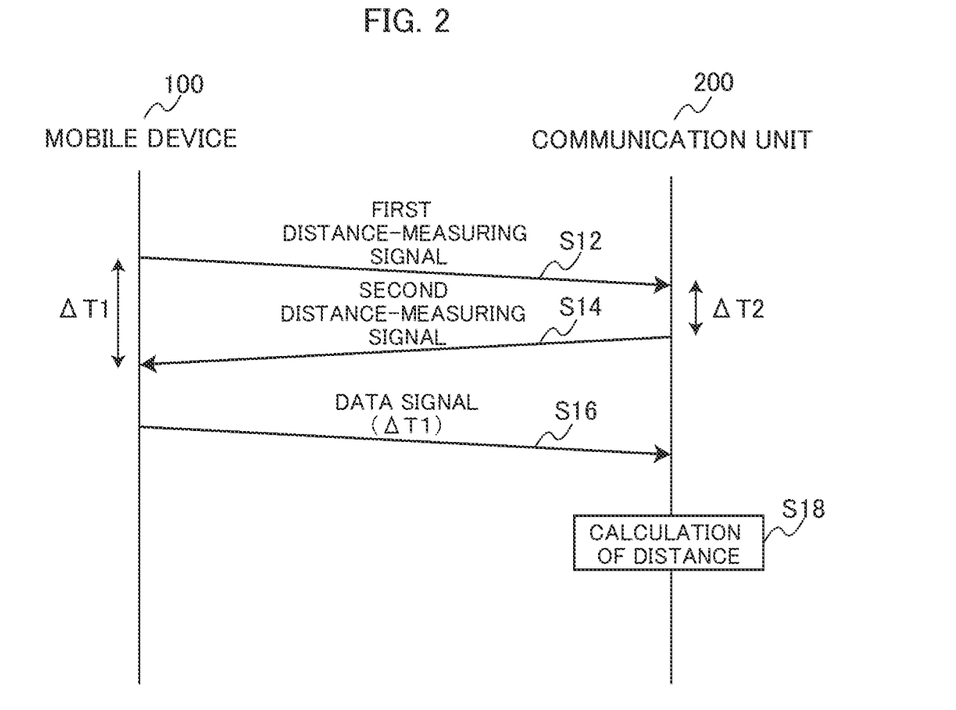
FIG. 2 is a sequence diagram illustrating an example of a routine of a distance measuring process that is performed in the system according to the embodiment.

FIG. 2 is a sequence diagram illustrating an example of a routine of the distance measuring process that is performed in the system 1 according to this embodiment. The mobile device 100 and the communication unit 200 participate in this sequence.

As illustrated in FIG. 2, first, the second wireless communicator 120 of the mobile device 100 transmits a first distance-measuring signal (Step S12). For example, the first distance-measuring signal may be transmitted as a signal using UWB.

Subsequently, when the first distance-measuring signal is received from the mobile device 100, the second wireless communicator 220 of the communication unit 200 transmits a second distance-measuring signal as a response to the first distance-measuring signal (Step S14). For example, the second distance-measuring signal may be transmitted as a signal using UWB.

At this time, the controller 240 of the communication unit 200 measures a time period $\Delta T2$ from a time point at which the communication unit 200 has received the first distance-measuring signal to a time point at which the communication unit 200 has transmitted the second distance-measuring signal. On the other hand, when the second distance-measuring signal is received from the communication unit 200, the controller 140 of the mobile device 100 measures a time period $\Delta T1$ from a time point at which the mobile device 100 has transmitted the first distance-measuring signal to a time point at which the mobile device 100 has received the second distance-measuring signal.

Then, the second wireless communicator 220 of the mobile device 100 transmits a data signal including information indicating the time period $\Delta T1$ (Step S16). For example, the data signal may be transmitted as a signal using UWB.

Then, when the second wireless communicator 220 receives a data signal from the mobile device 100, the controller 240 of the communication unit 200 acquires a measured distance value indicating the distance between the mobile device 100 and the second wireless communicator 220 on the basis of the time period $\Delta T1$ indicated by the received data signal and the measured time period $\Delta T2$ (Step S18). For example, first, the controller 240 calculates a propagation time by dividing $\Delta T1 - \Delta T2$ by 2. Here, the propagation time is a time period in which a signal is transmitted or received one way between the mobile device 100 and the second wireless communicator 220. Then, the controller 240 calculates the measured distance value indicating the distance between the mobile device 100 and the second wireless communicator 220 by multiplying the propagation time by a speed of the signal.

Here, it is preferable that a signal using UWB be transmitted or received in the distance-measuring communication. It is preferable that at least the distance-measuring communication be transmitted or received as a signal using UWB. With this configuration, it is possible to measure a distance with high accuracy as described above in association with UWB.

(2) Arrangement of Wireless Communicators

Relative positions of the first wireless communicator 210 and the second wireless communicator 220 with respect to the vehicle 202 are fixed. For example, the first wireless communicator 210 and the second wireless communicator 220 are disposed at predetermined positions of the vehicle 202.

Figure 3:
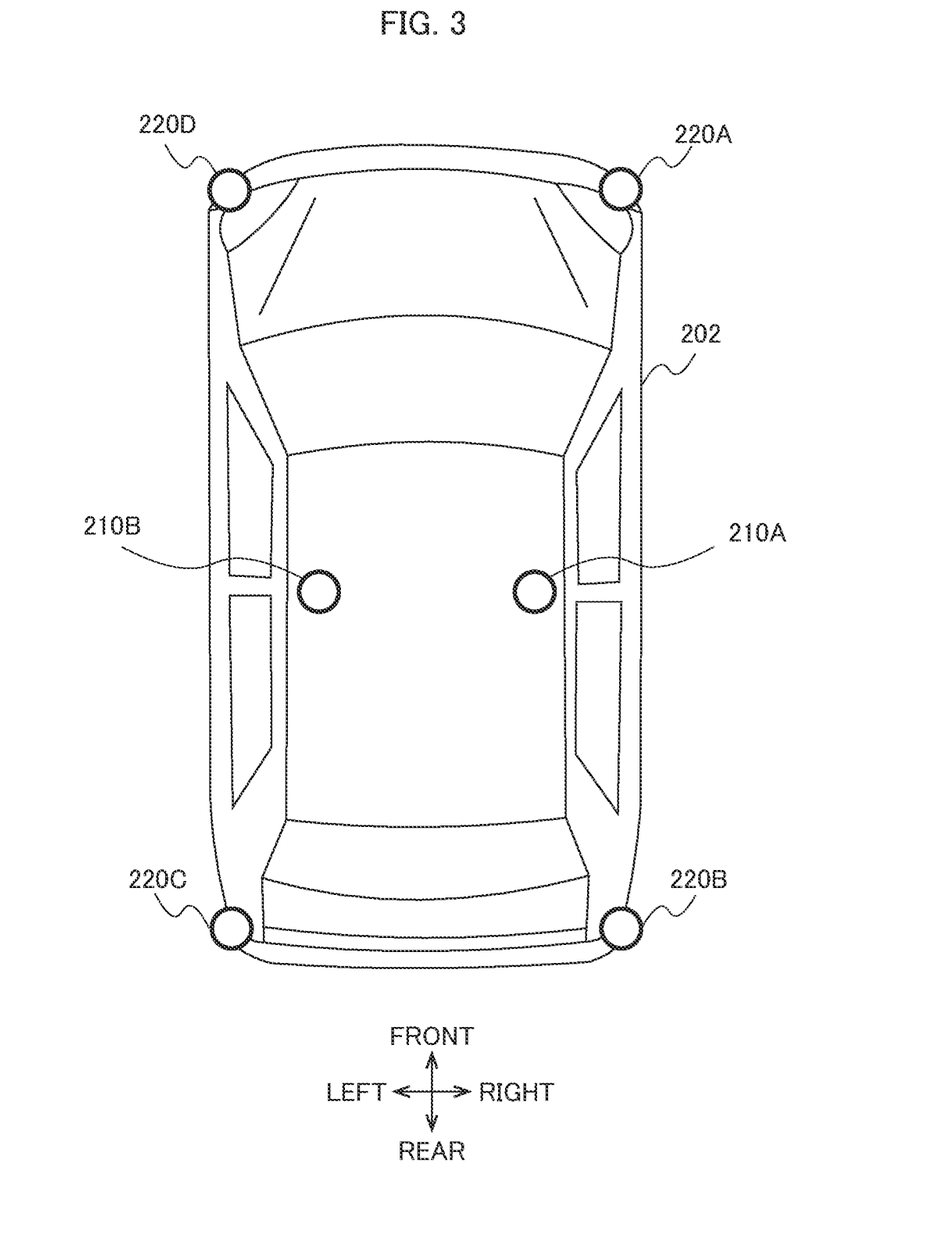
FIG. 3 is a diagram illustrating an example in which a first wireless communicator and a second wireless communicator according to the embodiment are arranged.

FIG. 3 is a diagram illustrating an example in which the first wireless communicator 210 and the second wireless communicator 220 are arranged according to this embodiment. In the example illustrated in FIG. 3, the first wireless communicator 210A, the second wireless communicator 210B, and the second wireless communicators 220A to 220D are provided in the vehicle 202. As illustrated in FIG. 3, a traveling direction of the vehicle 202 is also referred to as a forward direction. The opposite direction of the traveling direction of the vehicle 202 is also referred to as a rearward direction. Directions perpendicular to the traveling direction of the vehicle 202 are also referred to as a rightward direction and a leftward direction.

The first wireless communicator 210A and the first wireless communicator 210B are disposed at different positions. In the example illustrated in FIG. 3, the first wireless communicator 210A and the first wireless communicator 210B are disposed at positions which are laterally separated from each other in the vicinity of the center in the longitudinal direction of the vehicle 202. Specifically, the first wireless communicator 210A is disposed on the right side of the center of the vehicle 202. The first wireless communicator 210B is disposed on the left side of the center of the vehicle 202. For example, the first wireless communicator 210A and the first wireless communicator 210B may be disposed in the cabin. The cabin is a space which is provided in the vehicle 202 for a user to get in the vehicle 202.

The second wireless communicators 220A to 220D are disposed at different positions. As illustrated in FIG. 3, the second wireless communicators 220A to 220D are disposed outside of the cabin of the vehicle 202. Specifically, the second wireless communicators 220A to 220D are disposed at ends in the longitudinal direction of the vehicle 202 and at ends in the lateral direction of the vehicle 202. For example, the second wireless communicator 220A is disposed at the front-right end of the vehicle 202. The second wireless communicator 220B is disposed at the rear-right end of the vehicle 202. The second wireless communicator 220C is disposed at the rear-left end of the vehicle 202. The second wireless communicator 220D is disposed at the front-left end of the vehicle 202. For example, the second wireless communicators 220A to 220D may be disposed in bumpers of the vehicle 202. The bumper is a shock absorber that reduces shocks and vibration when the vehicle 202 collides with another object.

(3) Position Estimating Process

The controller 240 performs a position estimating process. The position estimating process is a process of estimating a position at which the mobile device 100 is located.

The position of the mobile device 100 estimated through the position estimating process is used for authentication which is performed between the mobile device 100 and the communication unit 200. For example, the authentication succeeds when the estimated position of the mobile device 100 is included in a prescribed range, and the authentication fails when the estimated position of the mobile device 100 is not included in the prescribed range.

Position Estimating Process Based on a Plurality of Measured Distance Values

The controller 240 estimates the position at which the mobile device 100 is located on the basis of a plurality of measured distance values which indicate distances between the plurality of second wireless communicators 220 and the mobile device 100 and which have been acquired through wireless communication performed by the plurality of second wireless communicators 220. Here, wireless communication is the aforementioned distance-measuring communication. The controller 240 acquires the plurality of measured distance values indicating the distances between the plurality of second wireless communicators 220 and the mobile device 100 by causing the plurality of second wireless communicators 220 to perform the distance-measuring communication. Then, the controller 240 estimates the position at which the mobile device 100 is located on the basis of the plurality of acquired measured distance values. Particularly, the controller 240 according to this embodiment estimates the position at which the mobile device 100 is located on the basis of two measured distance values acquired by two different second wireless communicators 220.

The position at which the mobile device 100 is located and which is estimated in this embodiment is a relative position of the mobile device 100 with respect to the communication unit 200. Specifically, the position at which the mobile device 100 is located is coordinates of the mobile device 100 in a first coordinate system. The first coordinate system is a coordinate system in which an arbitrary position of which a relative position with respect to the communication unit 200 (more accurately each of the plurality of second wireless communicators 220) is fixed is set as the origin. An example of the first coordinate system is a coordinate system in which the position of one of the plurality of second wireless communicators 220 is set as the origin. Another example of the first coordinate system is a coordinate system in which an arbitrary position of the vehicle 202 is set as the origin. An example of the arbitrary position of the vehicle 202 is a center point of the vehicle 202.

The storage 230 stores information indicating the positions of the plurality of second wireless communicators 220. The information indicating the positions may be coordinates in the first coordinate system. The controller 240 estimates the position at which the mobile device 100 is located additionally on the basis of the positions of the plurality of second wireless communicators 220.

Figure 4:
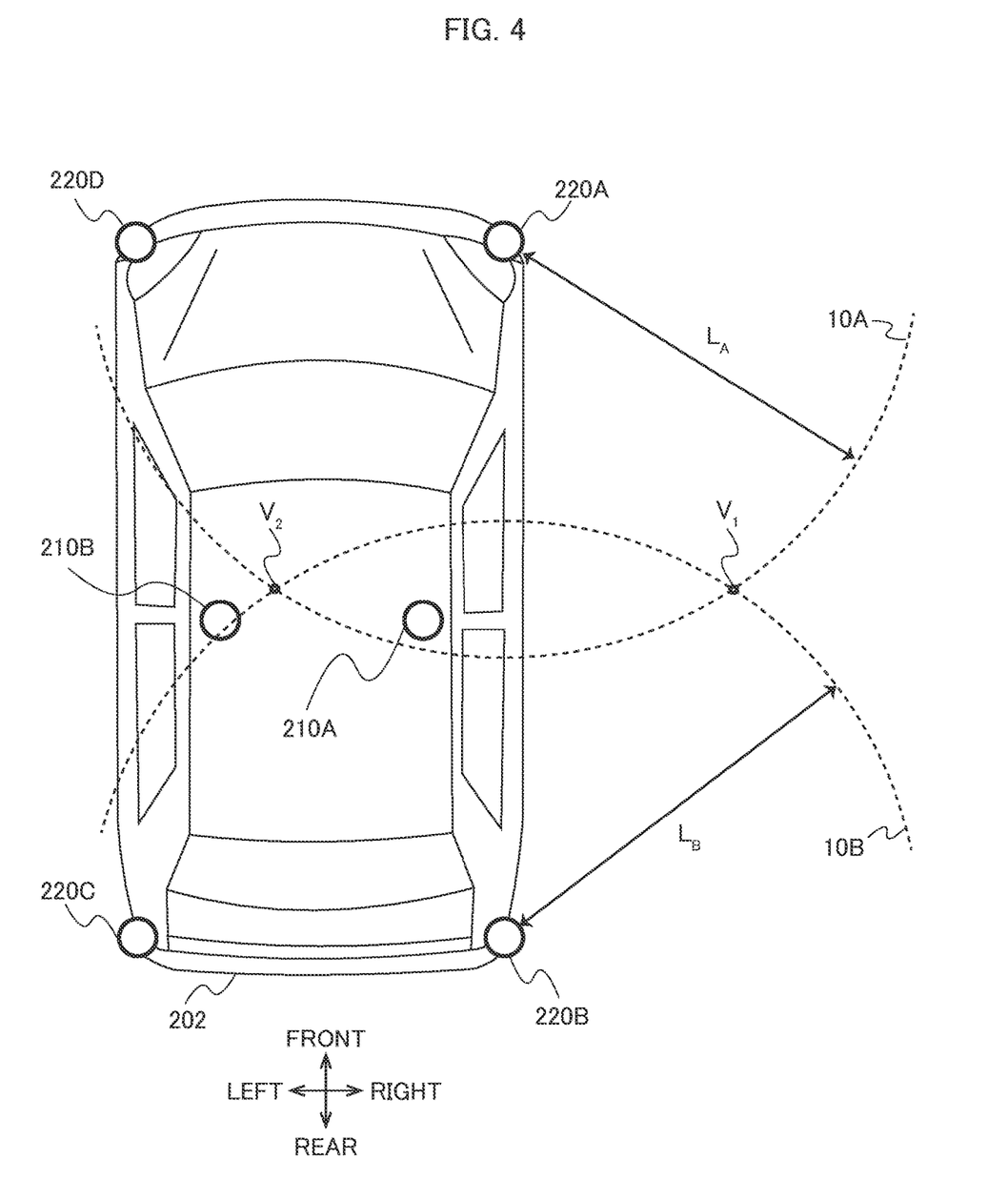
FIG. 4 is a diagram illustrating an example of a position estimating process according to the embodiment.

An example of the position estimating process based on a plurality of measured distance values will be described with reference to FIG. 4. FIG. 4 is a diagram illustrating an example of the position estimating process according to this embodiment. In FIG. 4, an example in which the position at which the mobile device 100 is located is estimated on the basis of a plurality of measured distance values acquired through distance-measuring communication performed by the second wireless communicator 220A and the second wireless communicator 220B is illustrated. A measured distance value $L_A$ is a measured distance value acquired through distance-measuring communication performed between the second wireless communicator 120 of the mobile device 100 and the second wireless communicator 220A of the communication unit 200. A measured distance value $L_B$ is a measured distance value acquired through distance-measuring communication performed between the second wireless communicator 120 of the mobile device 100 and the second wireless communicator 220B of the communication unit 200.

The controller 240 estimates coordinates in the first coordinate system satisfying conditions that a distance from the coordinates of the second wireless communicator 220A is the measured distance value $L_A$ and the distance from the coordinates of the second wireless communicator 220B is the measured distance value $L_B$ as the position at which the mobile device 100 is located. For example, the controller 240 estimates an intersection point $V_1$ and an intersection point $V_2$ between a circle 10A in which the radius centered on the coordinates of the second wireless communicator 220A is the measured distance value $L_A$ and a circle 10B in which the radius centered on the coordinates of the second wireless communicator 220B is the measured distance value $L_B$ as the position at which the mobile device 100 is located.

With the aforementioned position estimating process based on a plurality of measured distance values, it is possible to estimate that the mobile device 100 is located at one of the intersection point $V_1$ and the intersection point $V_2$. Accordingly, according to this embodiment, it is possible to specifically estimate the position of the mobile device 100 from simple measured distance values.

Position Estimating Process Based on a Plurality of Measured Distance Values and Space Information As the position estimating process, the controller 240 may estimate the position at which the mobile device 100 is located on the basis of space information that is information indicating a space in which the mobile device 100 is assumed to be located in addition to the plurality of measured distance values. That is, the controller 240 may estimate the position at which the mobile device 100 is located on the basis of the space information in addition to the measured distance values in the position estimating process. With this configuration, it is possible to improve position estimation accuracy.

As the position estimating process, the controller 240 may estimate a position belonging to the space which is indicated by the space information and in which the mobile device 100 is assumed to be located out of a plurality of positions at which the mobile device 100 can be located and which have been estimated on the basis of a plurality of measured distance values as the position of the mobile device 100. As described above with reference to FIG. 4, the controller 240 can estimate a plurality of positions as the position at which the mobile device 100 is located through the position estimating process based on a plurality of measured distance values. Therefore, the controller 240 decreases the number of positions estimated through the position estimating process based on a plurality of measured distance values to a smaller number (for example, one position) on the basis of the space information. With this configuration, it is possible to more specifically estimate the position at which the mobile device 100 is located.

The space information may be information indicating a direction in which the mobile device 100 is located as the space in which the mobile device 100 is assumed to be located. For example, the space information may indicate that the mobile device 100 is assumed to be located on the right side of the vehicle 202. For example, the space information may indicate that the mobile device 100 is assumed to be located on the left side of the vehicle 202. With this configuration, a position in a direction indicated by the space information out of a plurality of positions estimated through the position estimating process based on a plurality of measured distance values can be estimated as the position at which the mobile device 100 is located.

The space information may be acquired through wireless communication which has been performed using a wireless communication standard different from the wireless communication standard used for distance-measuring communication performed by the plurality of second wireless communicators 220 to acquire measured distance values. For example, the space information may be acquired through wireless communication performed using BLE by the first wireless communicator 210. For example, the space information may indicate a direction in which the mobile device 100 is located and which is indicated by a magnitude relationship of radio field intensities in a plurality of first wireless communicators 210 when the plurality of first wireless communicators 210 have received signals from the first wireless communicator 110 of the mobile device 100. An example of the radio field intensity is a received signal strength indicator (RSSI). The first wireless communicator 210 with a greater RSSI has a smaller distance from the mobile device 100. Accordingly, it is assumed that the mobile device 100 is located in a direction which is close to the first wireless communicator 210 with the greatest RSSI out of the plurality of first wireless communicators 210. With this configuration, it is possible to acquire space information using BLE in which power consumption on a receiving side is lower than that of UWB. That is, it is possible to decrease power consumption of the communication unit 200.

The storage 230 stores information indicating the positions of the plurality of first wireless communicators 210. The information indicating the positions may be coordinates in the first coordinate system. The controller 240 estimates the position at which the mobile device 100 is located additionally on the basis of the positions of the first wireless communicators 210.

Figure 5:
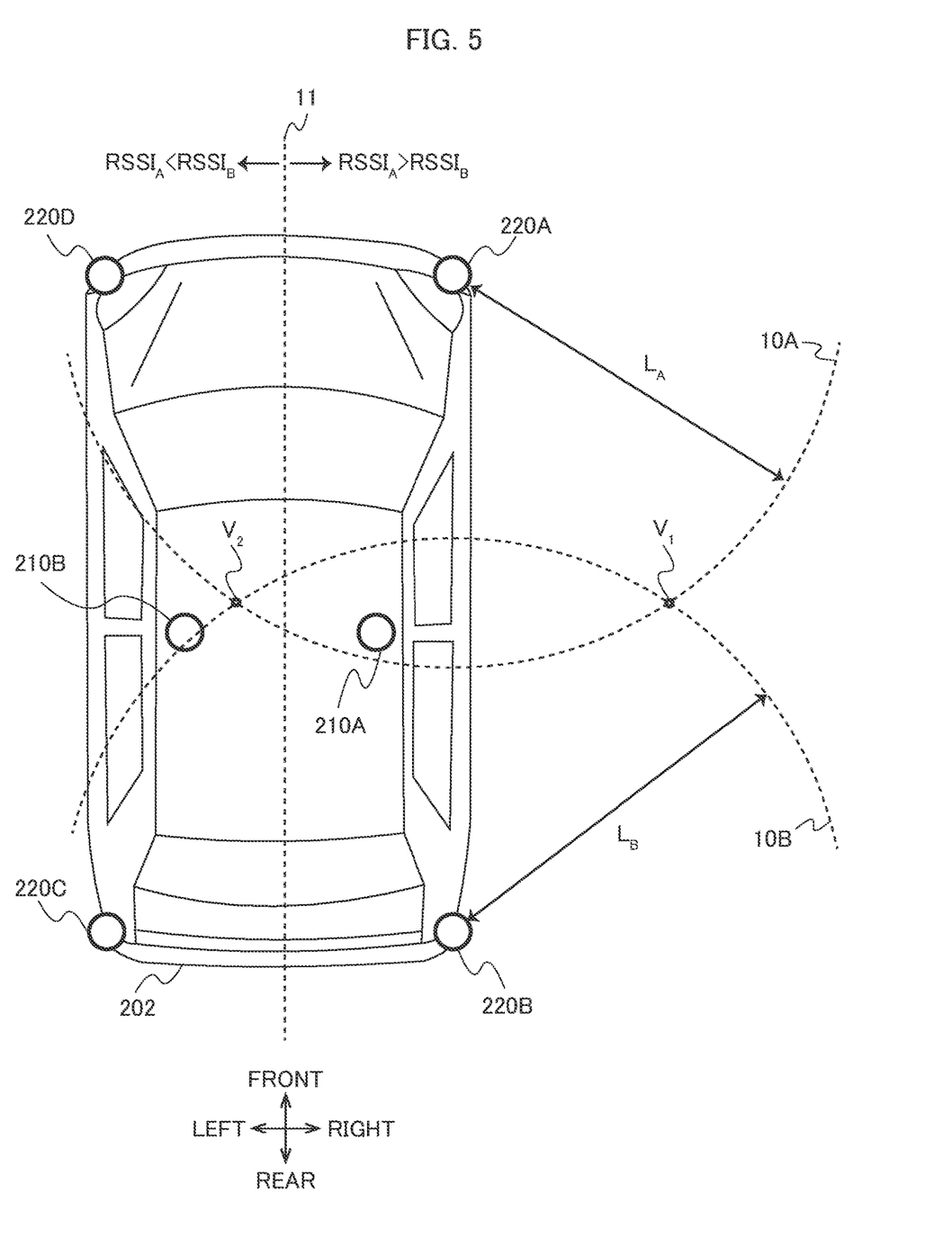
FIG. 5 is a diagram illustrating an example of the position estimating process according to the embodiment.

An example of the position estimating process based on a plurality of measured distance values and space information will be described with reference to FIG. 5. FIG. 5 is a diagram illustrating an example of the position estimating process according to this embodiment. As described above with reference to FIG. 4, the intersection point $V_1$ and the intersection point $V_2$ are estimated as the position at which the mobile device 100 is located through the position estimating process based on a plurality of measured distance values. In the example illustrated in FIG. 5, it is assumed that the magnitude relationship between $RSSI_A$ and $RSSI_B$ is acquired as the space information. $RSSI_A$ is an RSSI acquired by the first wireless communicator 210A. $RSSI_B$ is an RSSI acquired by the first wireless communicator 210B.

When $RSSI_A$ is greater than $RSSI_B$, it is assumed that the mobile device 100 be located in the direction which is closer to the first wireless communicator 210A with respect to an axis 11 passing through the center between the coordinates of the first wireless communicator 210A and the coordinates of the first wireless communicator 210B in the first coordinate system. More briefly, when $RSSI_A$ is greater than $RSSI_B$, it is assumed that the mobile device 100 be located on the right side of the vehicle 202. Accordingly, when $RSSI_A$ is greater than $RSSI_B$, the controller 240 estimates that the mobile device 100 is located on the intersection point $V_1$ which is on the right side of the vehicle 202 out of the intersection point $V_1$ and the intersection point $V_2$.

On the other hand, when $RSSI_B$ is greater than $RSSI_A$, it is assumed that the mobile device 100 be located in the direction which is closer to the first wireless communicator 210B with respect to the axis 11 passing through the center between the coordinates of the first wireless communicator 210A and the coordinates of the first wireless communicator 210B in the first coordinate system. More briefly, when $RSSI_B$ is greater than $RSSI_A$, it is assumed that the mobile device 100 be located on the left side of the vehicle 202. Accordingly, when $RSSI_B$ is greater than $RSSI_A$, the controller 240 estimates that the mobile device 100 is located on the intersection point $V_2$ which is on the left side of the vehicle 202 out of the intersection point $V_1$ and the intersection point $V_2$.

With the aforementioned position estimating process based on a plurality of measured distance values and the space information, it is possible to determine at which of the intersection point $V_1$ and the intersection point $V_2$ estimated through the position estimating process based on the plurality of measured distance values the mobile device 100 is located. Accordingly, according to this embodiment, it is possible to specifically estimate the position of the mobile device 100 on the basis of the simple measured distance values and the position estimating process based on the plurality of measured distance values.

(4) Routine of Processes

Figure 6:
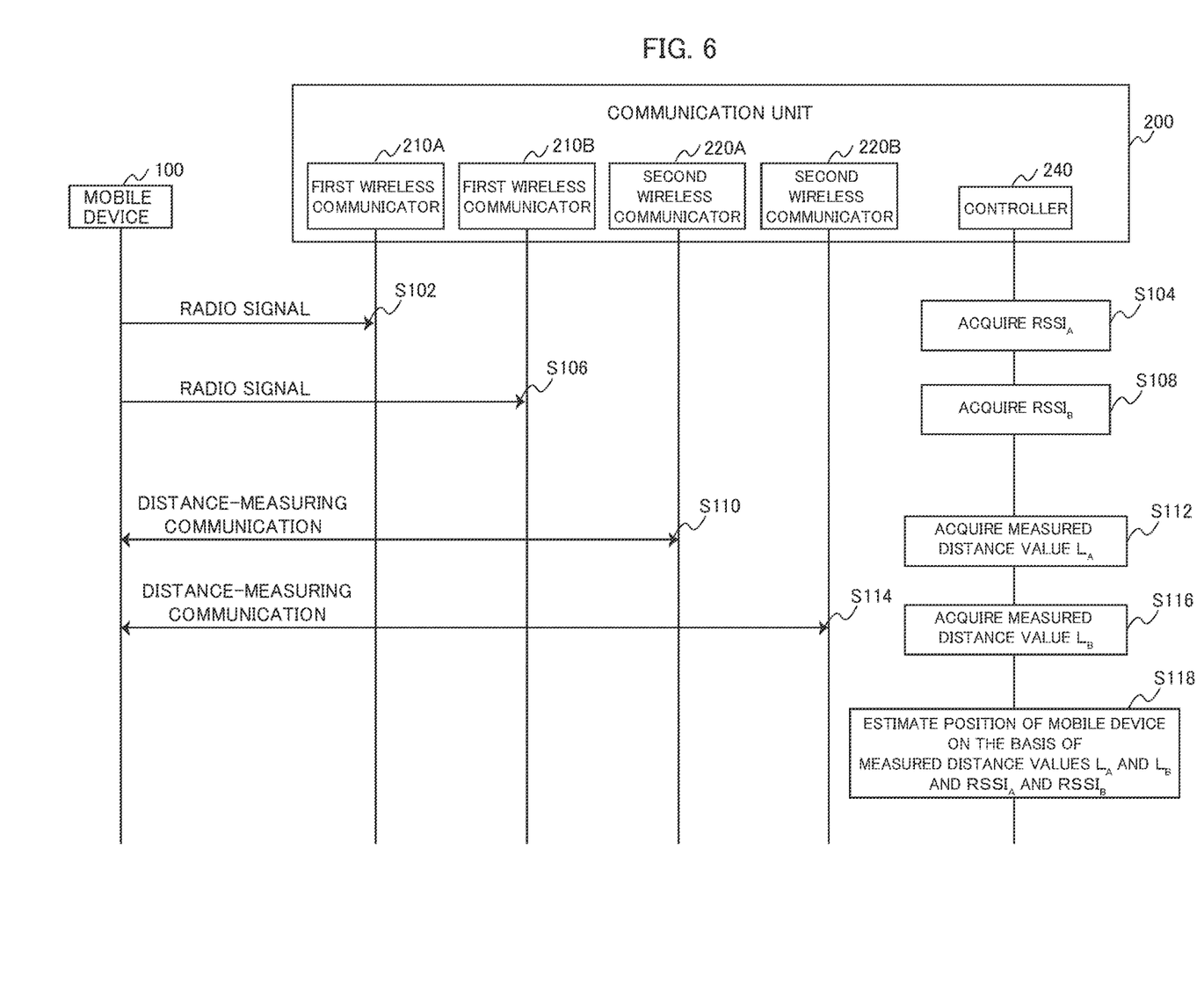
FIG. 6 is a sequence diagram illustrating an example of a routine of a position estimating process that is performed in the system according to the embodiment.

FIG. 6 is a sequence diagram illustrating an example of a routine of the position estimating processes that are performed in the system 1 according to this embodiment. The mobile device 100 and the communication unit 200 participate in this sequence. In this sequence, it is assumed that the second wireless communicator 220A and the second wireless communicator 220B perform distance-measuring communication.

As illustrated in FIG. 6, first, the first wireless communicator 110 of the mobile device 100 transmits a radio signal (Step S102). The radio signal is transmitted, for example, using BLE. When the radio signal is received by the first wireless communicator 210A, the controller 240 of the communication unit 200 acquires $RSSI_A$ which is the radio field intensity when the radio signal has been received by the first wireless communicator 210A (Step S104).

Similarly, the first wireless communicator 110 of the mobile device 100 transmits a radio signal (Step S106). The radio signal is transmitted, for example, using BLE. When the radio signal is received by the first wireless communicator 210B, the controller 240 of the communication unit 200 acquires $RSSI_B$ which is the radio field intensity when the radio signal has been received by the first wireless communicator 210B (Step S108).

Subsequently, the second wireless communicator 120 of the mobile device 100 and the second wireless communicator 220A of the communication unit 200 perform distance-measuring communication (Step S110). In the distance-measuring communication, for example, a signal using UWB is transmitted. The controller 240 of the communication unit 200 acquires a measured distance value $L_A$ indicating the distance between the mobile device 100 and the second wireless communicator 220A on the basis of the information acquired through distance-measuring communication of the second wireless communicator 220A (Step S112).

Similarly, the second wireless communicator 120 of the mobile device 100 and the second wireless communicator 220B of the communication unit 200 perform distance-measuring communication (Step S114). In the distance-measuring communication, for example, a signal using UWB is transmitted. The controller 240 of the communication unit 200 acquires a measured distance value $L_B$ indicating the distance between the mobile device 100 and the second wireless communicator 220B on the basis of the information acquired through distance-measuring communication of the second wireless communicator 220B (Step S116).

Then, the controller 240 of the communication unit 200 estimates the position at which the mobile device 100 is located on the basis of the measured distance value $L_A$, the measured distance value $L_B$, and the magnitude relationship between $RSSI_A$ and $RSSI_B$ which is space information (Step S118). For example, first, the controller 240 identifies coordinates of an intersection point $V_1$ and an intersection point $V_2$ between a circle 10A in which the radius centered on the coordinates of the second wireless communicator 220A is the distance $L_A$ and a circle 10B in which the radius centered on the coordinates of the second wireless communicator 220B is the distance $L_B$. Then, when $RSSI_A$ is greater than $RSSI_B$, the controller 240 estimates that the mobile device 100 is located at the intersection point $V_1$ which is on the right side of the vehicle 202 out of the intersection point $V_1$ and the intersection point $V_2$. On the other hand, when $RSSI_B$ is greater than $RSSI_A$, the controller 240 estimates that the mobile device 100 is located at the intersection point $V_2$ which is on the left side of the vehicle 202 out of the intersection point $V_1$ and the intersection point $V_2$.

3. Supplement

Heretofore, preferred embodiments of the present invention have been described in detail with reference to the appended drawings, but the present invention is not limited thereto. It should be understood by those skilled in the art that various changes and alterations may be made without departing from the spirit and scope of the appended claims.

For example, in the aforementioned embodiment, information indicating the direction in which the mobile device 100 is located and which is indicated by RSSI in each of a plurality of first wireless communicators 210 is used as an example of the space information, but the present invention is not limited to this example.

For example, the space information may be information indicating a space including the position at which the mobile device 100 is located and which was estimated in the past at the position at which the communication unit 200 is located as the space in which the mobile device 100 is assumed to be located. Specifically, the communication unit 200 stores position information indicating the position of the communication unit 200 and position information indicating the position of the mobile device 100 estimated through the position estimating process in correlation. Then, when the position estimating process is performed again at the position at which the position estimating process was performed in the past, the communication unit 200 estimates that the mobile device 100 is located in the same space which includes the position of the mobile device 100 and which was estimated through the position estimating process performed in the past. For example, when a house of a user is located on the right side of a garage, the user often approaches the vehicle 202 parking in the garage from the right side of the vehicle 202. Therefore, when the vehicle 202 is in the garage, the communication unit 200 estimates that the mobile device 100 is located at a position on the right side of the vehicle 202 out of the positions estimated through the position estimating process based on a plurality of measured distance values. With this configuration, the communication unit 200 can perform the position estimating process based on the space information without causing the first wireless communicator 210 to perform wireless communication.

For example, the space information may indicate the inside or the outside of the cabin of the vehicle 202 as the space in which the mobile device 100 is assumed to be located. For example, the communication unit 200 may further include an imaging unit configured to capture an image of the inside of the cabin. The space information may be acquired on the basis of the image captured by the imaging unit.

Specifically, when a user appears in the inside of the cabin, the communication unit 200 acquires the space information indicating the inside of the cabin as the space in which the mobile device 100 is assumed to be located. In this case, the communication unit 200 estimates that the mobile device 100 is located at a position in the inside of the cabin out of the positions estimated through the position estimating process based on a plurality of measured distance values. That is, the communication unit 200 may estimate the position at which the mobile device 100 is located in the inside of the cabin.

On the other hand, when a user does not appear in the inside of the cabin, the communication unit 200 acquires the space information indicating the outside of the cabin as the space in which the mobile device 100 is assumed to be located. In this case, the communication unit 200 estimates that the mobile device 100 is located at a position in the outside of the cabin out of the positions estimated through the position estimating process based on a plurality of measured distance values. That is, the communication unit 200 may estimate the position at which the mobile device 100 is located in the outside of the cabin.

For example, an example in which the position at which the mobile device 100 is located is estimated on the basis of the plurality of measured distance values and space information has been described in the aforementioned embodiment, but the present invention is not limited to this example. For example, the position at which the mobile device 100 is located may be estimated on the basis of one measured distance value and space information. In this case, the controller 240 estimates that the mobile device 100 is located at one position on a circle in which the distance from the second wireless communicator 220 is the measured distance value in the space in which the mobile device 100 is assumed to be located and which is indicated by the space information.

For example, an example in which the controller 240 calculates the measured distance values has been described above in the aforementioned embodiment, but the present invention is not limited to this example. For example, the second wireless communicator 220 may calculate the measured distance values. In this case, the second wireless communicator 220 reports the calculated measured distance values to the controller 240.

For example, in the aforementioned embodiment, information indicating the time period ΔT1 from the time point at which the mobile device 100 has transmitted the first distance-measuring signal to the time point at which the mobile device 100 has received the second distance-measuring signal is included in a data signal, but the present invention is not limited to this example. The data signal has only to include information on the time point at which the first distance-measuring signal has been transmitted and the time point at which the second distance-measuring signal has been received. Another example of the information included in the data signal will be described below.

Another example of the information included in the data signal is information indicating the time point at which the mobile device 100 has transmitted the first distance-measuring signal and the time point at which the mobile device 100 has received the second distance-measuring signal. That is, the mobile device 100 may not calculate the time period ΔT1 but transmit time stamps of a start point and an end point of the time period ΔT1.

Another example of the information included in the data signal is a measured distance value indicating the distance between the mobile device 100 and the communication unit 200 which has been calculated on the basis of a time period from the time point at which the first distance-measuring signal has been transmitted and the time point at which the second distance-measuring signal has been received. That is, the mobile device 100 may calculate the measured distance value indicating the distance between the mobile device 100 and the communication unit 200 and transmit the calculated measured distance value to the communication unit 200. For example, when ΔT2 is a fixed value, the mobile device 100 can calculate the measured distance value by measuring the time period ΔT1.

For example, an example in which the mobile device 100 transmits the first distance-measuring signal has been described above in the aforementioned embodiment, but the present invention is not limited to this example. For example, the communication unit 200 may transmit the first distance-measuring signal. In this case, when the first distance-measuring signal has been received, the mobile device 100 transmits the second distance-measuring signal as a response thereto. Then, the mobile device 100 transmits a data signal including information indicating the time period ΔT2 from the time point at which the first distance-measuring signal has been received to the time point at which the second distance-measuring signal has been received. On the other hand, the communication unit 200 calculates the measured distance value on the basis of the time period ΔT1 from the time point at which the first distance-measuring signal has been transmitted and the time point at which the second distance-measuring signal has been received and the time period ΔT2 included in the data signal.

For example, an example in which the measured distance value is calculated on the basis of the propagation time has been described above in the aforementioned embodiment, but the present invention is not limited to this example. For example, the measured distance value may be calculated on the basis of radio field intensities.

For example, an example in which the first wireless communication standard is BLE and the second wireless communication standard is a wireless communication standard using UWB has been described above in the aforementioned embodiment, but the present invention is not limited to this example. For example, a wireless communication standard using a signal in a ultra-high frequency (UHF) band and a low frequency (LF) band may be used as the first wireless communication standard or the second wireless communication standard. For example, Wi-Fi (registered trademark), near-field communication (NFC), or a wireless communication standard using infrared, may be used as the first wireless communication standard or the second wireless communication standard. The first wireless communication standard and the second wireless communication standard may be the same or different from each other.

For example, although not particularly described in the aforementioned embodiment, various connection modes between the second wireless communicator 220 and the controller 240 can be considered. For example, the plurality of second wireless communicators 220 may be directly connected to the controller 240. That is, the plurality of second wireless communicators 220 may be connected in parallel to the controller 240. For example, the plurality of second wireless communicators 220 may be classified into a second wireless communicator 220 serving as a master and a second wireless communicator 220 serving as a slave. The slave may be indirectly connected to the controller 240 via the master, and the master may be directly connected to the controller 240. That is, one or more slaves may be connected in parallel to the master, and the master may be connected to the controller 240. The same is true of the connection mode between the first wireless communicator 210 and the controller 240.

For example, an example in which the communication unit 200 estimates the relative position of the mobile device 100 with respect to the communication unit 200 has been described above in the aforementioned embodiment, but the present invention is not limited to this example. For example, the mobile device 100 may estimate the relative position of the mobile device 100 with respect to the communication unit 200. In this case, the mobile device 100 acquires information acquired through wireless communication performed by the first wireless communicator 210 and the second wireless communicator 220 of the communication unit 200 from the communication unit 200. Then, the controller 140 of the mobile device 100 performs the same process as in the controller 240 of the communication unit 200 described above in the aforementioned embodiment. An application of this configuration is a car finder. The car finder is a function of ascertaining the parking position of the vehicle 202. For example, the relative position of the mobile device 100 with respect to the communication unit 200 may be estimated by a device other than the mobile device 100 and the communication unit 200.

For example, an example in which the communication unit 200 is a communication device mounted in a vehicle has been described above in the embodiment, but the present invention is not limited to the example. The communication unit 200 may be mounted in an arbitrary mobile object such as an aircraft and a watercraft. Here, a mobile object is a moving device.

For example, an example in which the present invention is applied to a smart entry system has been described above in the embodiment, but the present invention is not limited to the example. The present invention is applicable to an arbitrary system that performs wireless communication. For example, the present invention is applicable to a pair including two of a mobile device, a vehicle, a smartphone, a drone, a house, and a home appliance. This pair may include two devices of the same type or include two devices of two different types.

Note that, a series of processes performed by the devices described in this specification may be achieved by any of software, hardware, and a combination of software and hardware. A program that configures software is stored in advance in, for example, a recording medium (non-transitory medium) installed inside or outside the devices. In addition, for example, when a computer executes the programs, the programs are read into random access memory (RAM), and executed by a processor such as a CPU. The recording medium may be a magnetic disk, an optical disc, a magneto-optical disc, flash memory, or the like. Alternatively, the above-described computer program may be distributed via a network without using the recording medium, for example.

Further, in the present specification, the processes described using the flowcharts and the sequence diagrams are not necessarily executed in the order illustrated in the drawings. Some processing steps may be executed in parallel. In addition, additional processing steps may be employed and some processing steps may be omitted.

REFERENCE SIGNS LIST

1 system
100 mobile device
110 first wireless communicator
120 second wireless communicator
130 storage
140 controller
200 communication unit
202 vehicle
210 first wireless communicator
220 second wireless communicator
230 storage
240 controller

The invention claimed is:

1. A communication system comprising:
a first communication device;
a second communication device; and
a vehicle,
wherein the first communication device transmits, to the second communication device, at least an electronic signal in a frequency band, and
wherein the second communication device is disposed in a vehicle capable of movement, and comprises:
a pair of first wireless communication circuits configured to perform wireless communication with the first communication device;
a pair of second wireless communication circuits configured to perform wireless communication with the first communication device; and
a microprocessor configured to estimate a position at which the first communication device is located on the basis of a plurality of measured distance values and space information, wherein the microprocessor controls authentication based on the estimated position at which the first communication device is located and controls the vehicle to perform an operation based on a result of the authentication,
wherein
the space information is information indicating a space in which the first communication device is assumed to be located, indicates that the first communication device is assumed to be located in a direction closer to one of the pair of first wireless communication circuits, and is acquired through wireless communication performed by the pair of first wireless communication circuits,
the plurality of measured distance values indicate distances between the pair of second wireless communication circuits and the first communication device, and which are acquired through wireless communication performed by the pair of second wireless communication circuits,
the pair of first wireless communication circuits are mounted in left and right directions of the vehicle, separated from each other, and
the pair of second wireless communication circuits are mounted in front and rear directions of the vehicle, separated from each other.

2. The communication system according to claim 1, wherein the microprocessor estimates a position in the space in which the first communication device is assumed to be located and which is indicated by the space information out of a plurality of positions at which the first communication device is able to be located and which have been estimated on the basis of the plurality of measured distance values as the position at which the first communication device is located as the estimating of the position at which the first communication device is located.

3. The communication system according to claim 1, wherein a wireless communication standard to which the first wireless communicator conforms and a wireless communication standard to which the second wireless communicator conforms are different.

4. The communication system according to claim 1, wherein the space information is information indicating a space including a position at which the first communication device was located and which was estimated in the past at the position at which the communication device is located as the space in which the first communication device is assumed to be located.

5. The communication system according to claim 1, wherein the first communication device is a device that is carried by a user of the vehicle.

6. The communication system according to claim 5, wherein the space information is information indicating the inside or the outside of a cabin of the vehicle as the space in which the first communication device is assumed to be located.

7. The communication system according to claim 5, wherein the microprocessor estimates the position at which the first communication device is located outside of the cabin.

8. The communication system according to claim 1,
wherein the microprocessor determines, on the basis of the space information, the position at which the first communication device is located among a plurality of positions estimated on the basis of the plurality of measured distance values.

9. The communication system according to claim 1,
wherein the operation performed by the vehicle based on the result of the authentication includes a physical movement operation by one or more components of the vehicle.

10. A position estimation method comprising:
transmitting, by a first communication device and to a second communication device, at least an electronic signal in a frequency band, wherein the second communication device is disposed in a vehicle capable of movement;
acquiring, by a pair of first wireless communication circuits of the second communication device, space information, wherein the space information is acquired through wireless communication performed by the pair of first wireless communication circuits with the first communication device;
acquiring, by a pair of second wireless communication circuits of the second communication device, a plurality of measured distance values, wherein the plurality of measured distance values is acquired through wireless communication performed by the pair of second wireless communication circuits with the first communication device;
estimating, by a microprocessor of the second communication device, a position at which the first communication device is located on the basis of the plurality of measured distance values and the space information; and
controlling, by the microprocessor, authentication based on the estimated position at which the first communication device is located, and controlling the vehicle to perform an operation based on a result of the authentication, wherein the space information is information indicating a space in which the first communication device is assumed to be located, and indicates that the first communication device is assumed to be located in a direction closer to one of the pair of first wireless communication circuits, the plurality of measured distance values indicate distances between the pair of second wireless communication circuits and the first communication device, the pair of first wireless communication circuits are mounted in left and right directions of the vehicle, separated from each other, and the pair of second wireless communication circuits are mounted in front and rear directions of the vehicle, separated from each other.

* * * * *